United States Patent Office 3,464,564
Patented Sept. 2, 1969

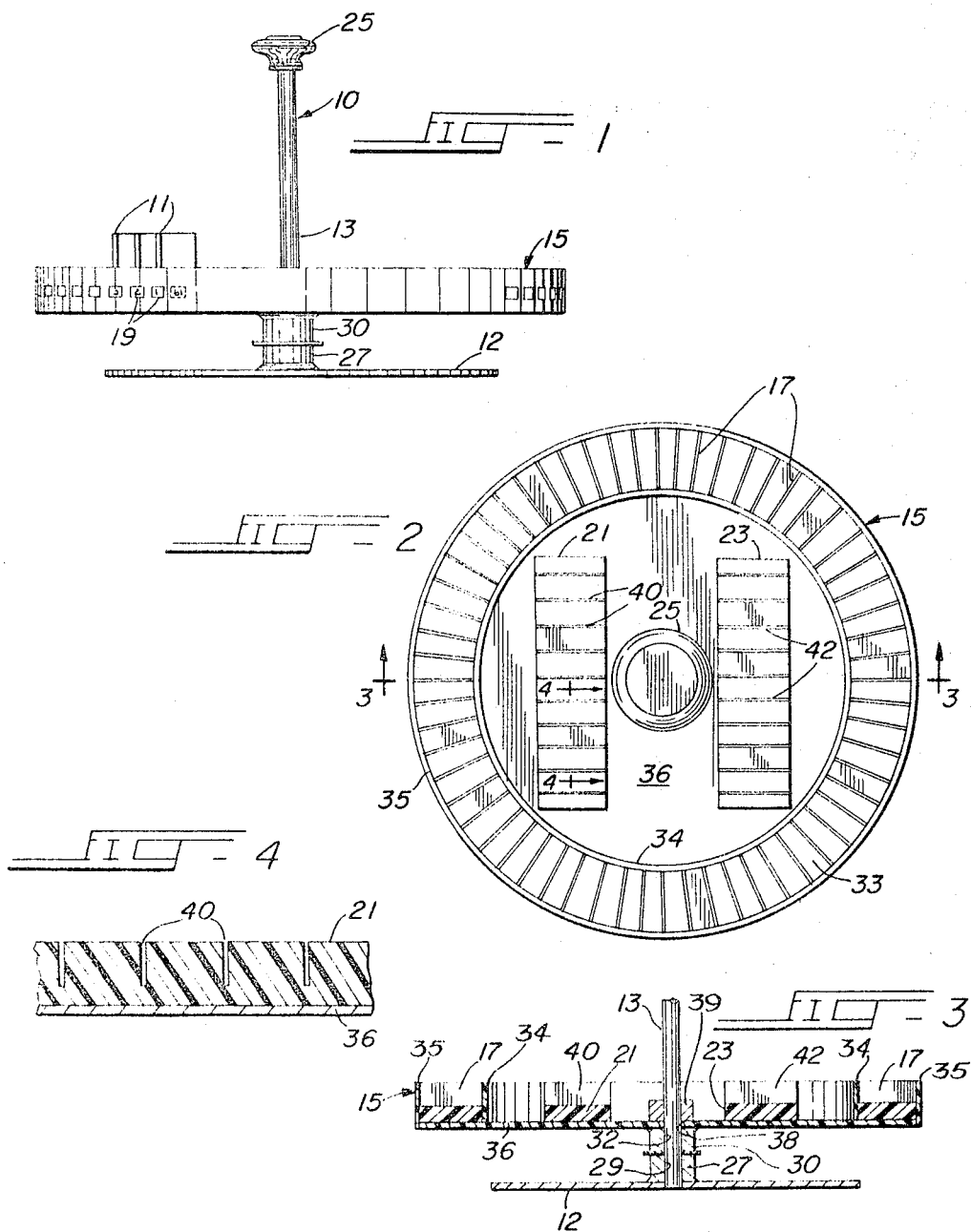

3,464,564
LABORATORY SLIDE TRAY AND SORTING METHOD
Mary Albeus MacNalley, 2537 S. Prairie Ave., Chicago, Ill. 60616
Filed Mar. 1, 1967, Ser. No. 619,629
Int. Cl. B42f 17/08; A47f 3/14, 5/02
U.S. Cl. 211—10                                  1 Claim

ABSTRACT OF THE DISCLOSURE

A tray for supporting normal and abnormal specimen slides includes a base, a vertical rod and an annular member rotatably mounted thereon and having a series of radial slots for receiving the slides and a pair of slide supports located within and spaced from its rim for receiving abnormal slides. Each slide and radial slot have corresponding identification numbers. When discovered, an abnormal slide is transferred from its radial slot to an abnormal slide support so that the vacant radial slot and its number indicates that its corresponding slide is abnormal and can be found in a slide support.

BACKGROUND OF THE INVENTION

This invention relates to a laboratory slide tray and sorting method, and it more particularly relates to a tray for supporting specimen slides each having either an abnormal or a normal specimen.

Various different types of trays and supports for specimen slides have been used in laboratories for the purpose of storing a relatively large number of slides in one location. In a medical laboratory, it is desirable to have such a slide tray which enables a person readily to distinguish slides having abnormal specimens from the slides having normal specimens. In the past, once a specimen slide was determined or at least suspected to be abnormal, a special identification label or a color coding device was attached to the abnormal slide. However, this technique was not entirely satisfactory. Since time is of the essence in pathological tests, valuable time could be wasted when the attending physician or pathologist was required to search through and observe the identifying label on each one of a relatively large number of closely spaced slides to find a given slide. The special identification or other designation was by necessity relatively small in size and not readily discernible. Such a technique was, therefore, time consuming and unnecessarily tedious.

SUMMARY OF THE INVENTION

Therefore, the principal object of the present invention is to provide a new and improved laboratory slide tray and method of use.

Another object of the present invention is to provide a specimen slide tray and method of using it, whereby the tray supports a large number of specimen slides, and it enables a person to quickly and effciently search the specimen slides to ascertain whether or not a given slide or group of slides is abnormal.

Briefly, the above and further objects are realized in accordance with the present invention by providing a laboratory slide tray having a rotatably mounted member with first and second slide holders mounted thereon in spaced-apart relationship. The first slide holder receives and supports a relatively large number of specimen slides and the second or abnormal slide holder receives and supports specimen slides ascertained to have abnormal specimens. In order to identify each slide, indicia are located on the member adjacent to each slide position in the first holder, and corresponding indicia are attached to each individual slide supported thereby. In use, once a particular specimen slide is determined or suspected to be abnormal by laboratory personnel, the abnormal slide is transferred from the first slide holder to the abnormal slide holder. As a result, an attending physician or pathologist can quickly and easily determine whether or not a given slide or group of slides is abnormal by observing whether or not the given slides are missing from the first slide holder. Upon locating a missing slide and observing its easily readable indicium on the rotatable member, the abnormal slide is thereby identified and may then be obtained from among the relatively smaller number of abnormal slides supported by the abnormal slide holder by finding the slide having the corresponding indicium. Thus, the smaller group of abnormal specimen slides are segregated from the larger group of normal slides, and yet, for convenience purposes, all of the slides are stored in the same tray.

BRIEF DESCRIPTION OF THE DRAWINGS

These and further objects of the present invention will be understood more fully and completely from the following detailed description when considered with reference to the accompanying sheet of drawings, wherein:

FIGURE 1 is a front elevational view of the laboratory slide tray of the present invention;

FIGURE 2 is a plan view of the laboratory slide tray of FIG. 1.

FIGURE 3 is a cross sectional view of FIG. 2 taken substantially along the line 3—3 thereof; and FIGURE 4 is a cross sectional view of FIG. 2 taken along the line 4—4 thereof.

DESCRIPTION OF THE PREFERRED EMBODIMENT

Referring now to FIGS. 1 and 2, there is shown a laboratory slide tray 10 which is capable of supporting a relatively large number of specimen slides, such as specimen slides 11, having either normal or abnormal specimens. The slide tray 10 includes as its principal elements a base 12, a vertical support rod 13, and, rotatably mounted thereon, an annular member 15 having slide receiving receptacles 17 with a set of indicia 19 individually associated with corresponding ones of the slots 17 and having a pair of slide supports 21 and 23 located within the annular member 15 and spaced therefrom. As illustrated in FIGS. 1 and 2, the specimen slides are inserted into the receptacles 17, but once a specimen slide is ascertained to have an abnormal specimen, it is transferred from its slot to one of the inner slide supports 21 or 23. Therefore, in order to enable an attending physician or pathologist to quickly ascertain whether a given slide is an abnormal slide, the annular member 15 may be rotated, and the relatively large and clearly discernible indicium associated with the given slide position may be readily observed to locate the given slide. If the given slide is missing from its slot, the given slide may then be quickly obtained from among the relatively smaller number of abnormal specimen slides supported by the slide supports 21 and 23.

Considered in greater detail and with reference to the other figures of the drawing, the base 12 is circular in shape and a rod 13 is secured thereto. A ball knob 25 is secured to the rod 13 for ease in lifting the tray 10. For the purpose of enabling the annular member 15 to rotate freely about the rod 13, a spool-like thrust bearing 27 having an axially-aligned bore 29 for loosely receiving the rod 13 rests on the top of the base 12, and another spool-like thrust bearing 30 having an axially aligned bore 32 for loosely receiving the rod 13 rests on the top of the bearing 27 so that the annular member 15 rests on the top of the upper bearing 30 and is thereby spaced from the base 12.

As shown in FIG. 2, the series of spaced-apart slide-receiving receptacles 17 are radially disposed about the annular member 15 for receiving and supporting the slides 11. In the preferred form of the invention, the annular member 15 comprises an annular block 33 having an inner rim 34 and an outer rim 35 secured thereto, and a circular bottom wall 36 secured to the underside of the annular block 33. For the purpose of providing slide receiving receptacles, the annular block 33 is provided with a series of radial slots cut therein with the rims 34 and 35 forming the ends of each of the receptacles. The bottom wall 36 is provided with a centrally located hole 38 (FIG. 3) and a rod-encircling collar 39 aligned therewith for loosely receiving the rod 13 so that the annular member 15 may be slid upwardly along the rod 13. In the event that more than one annular member is mounted on the same rod 13, the slidably mounted annular members may be secured in spaced-apart relationship along the rod 13.

For the purpose of designating each of the slots 17, the indicia or numbered labels 19 are secured to the outer wall of the rim 35 adjacent to each one of the slots 17. Each of the specimen slides is provided with an indicium (not shown in the drawings), which is identical to a corresponding one of the indicia 19 located adjacent to the radial slots 17.

For the purpose of supporting the abnormal slides, the separate pair of slide supports 21 and 23 are provided with a series of open-end receptacles or slots 40 and 42, respectively. Each of the slide supports 21 and 23 comprise a rectangularly shaped block fixedly secured to the bottom wall 36 of the annular member 34 on opposite sides of the center rod 13, and disposed within and spaced from the inner rim 34. The space between the inner slide supports 21 and 23 and the inner rim 34 provides a storage area for articles placed loosely therein, such, for example, as identification labels and color coding devices for various different types of clinical materials and specimens.

Method of use

In order to assist in quickly ascertaining whether or not a given slide or group of slides was previously determined to have an abnormal specimen, once a specimen slide is determined to have, or at least suspected to have, an abnormal specimen for pathology purposes, the slide having the abnormal specimen is immediately transferred by the laboratory personnel from its radial slot 17 located in the annular member 15 to one of the abnormal slide supports 21 or 23. Thereafter, an attending physician or pathologist may rotate the annular member 15 to observe whether or not the radial slot corresponding to the given slide is vacant. If vacant, the relatively large and easy to read indicium located adjacent to the vacant slot indicates that the given slide is an abnormal specimen slide, and, therefore, it may be readily obtained from among the relatively smaller number of abnormal slides supported by the inner slide supports 21 and 23.

Since time is of the essence in a medical laboratory, it is highly desirable to reduce the amount of time required for the attending physician or the pathologist to search for and locate given slides among a relatively large number of closely spaced specimen slides. Therefore, it should be readily apparent from the foregoing description that the slide tray 10 and the method of using the same in accordance with the present invention enables a person to quickly determine whether or not given specimen slides, located among a relatively large number of closely-spaced slides, are abnormal. If abnormal, they may be quickly obtained from a separate slide support which supports the relatively smaller number of abnormal slides. Also, the tray of the present invention enables the abnormal and normal slides to be stored in the same tray for convenience purposes. Furthermore, the circular shape of the annular member of the inventive tray lends itself to easily and conveniently viewing a relatively large number of slides.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. A laboratory slide tray adapted for supporting a plurality of normal and abnormal specimen slides, said normal slides supporting specimens which have been previously ascertained to be normal specimens in accordance with test standards and said abnormal slides supporting specimens which have been previously ascertained to be abnormal specimens in accordance with said test standards, comprising:

a base;

elongated support means secured to said base;

a tray member rotatbly mounted on said support means, said tray member including an annular block with an inner rim and an outer rim secured thereto;

a plurality of first slide receiving receptacles mounted on the tray member at the periphery thereof and adapted for receiving and supporting said plurality of specimen slides, the number of said receptacles being equal to the number of said normal and said abnormal specimen slides, said plurality of first receptacles comprising means defining a plurality of radially disposed slots in said annular block;

indicia means mounted on said tray member adjacent said receptacles for identifying each of said normal and abnormal specimen slides; and a plurality of second slide receiving receptacles mounted on the tray member in a spaced-apart relationship with said first receptacles and adapted for receiving and supporting said abnormal specimen slides upon removal from their first receptacles, whereby empty first slide receptacles indicate that the slides associated with the empty receptacles are the abnormal slides and therefore are located in said second receptacles.

References Cited

UNITED STATES PATENTS

| 550,048 | 11/1895 | Ketchum | 211—166 |
| 1,514,527 | 11/1924 | Hulett | 211—144 X |
| 1,599,913 | 9/1926 | Nicholas | 211—163 |
| 2,152,692 | 4/1939 | Hereford | 211—166 X |
| 2,442,709 | 6/1948 | Ramsdell | 211—131 |
| 853,215 | 5/1907 | Berg | 211—10 X |

CHANCELLOR E. HARRIS, Primary Examiner

R. P. SEITTER, Assistant Examiner

U.S. Cl. X.R.

211—58, 129, 163